Aug. 29, 1933. W. C. TESCH 1,924,171

DEVICE FOR SWAGING SAW TEETH

Filed June 12, 1931

Inventor
W. C. Tesch
By
Attorneys

Patented Aug. 29, 1933

1,924,171

UNITED STATES PATENT OFFICE 1,924,171

DEVICE FOR SWAGING SAW TEETH

Walter C. Tesch, Milwaukee, Wis.

Application June 12, 1931. Serial No. 543,845

4 Claims. (Cl. 76—53)

This invention relates to a new and useful device for swaging saw teeth.

One of the objects of the present invention is the provision of a novel device for swaging saw teeth which is of a portable nature and adapted to be manually or power operated for swaging the teeth of various types of saws and saws of various sizes.

Another object of the present invention is the provision of a swaging device for saw teeth wherein the saw is moved the distance between two teeth following each swaging operation, so that the teeth can be consecutively swaged until all of the teeth on the saw have been finished.

A further object of the present invention is the provision of a swaging device of the above character adapted to be manually controlled and is adjustable for various types of saws, as well as including means for automatically advancing the teeth of the saw during the swaging operation, and provided with adjustable means cooperating with the advancing means whereby to provide a positive engagement of the teeth with the advancing means, so that immediately following each swaging operation, the saw will be advanced equal to the distance between the teeth.

Another object of the present invention is the provision of a simple and inexpensive saw swaging device which is mounted upon a base member which carries adjustable means for clamping into position various sizes and types of saws, together with supporting means for adjustably mounting the swaging mechanism upon the base.

With the above and other objects in view, the invention consists in the novel features of construction, the combination and arrangement of parts hereinafter more fully set forth, pointed out in the claims and shown in the accompanying drawing wherein:

Figure 1:
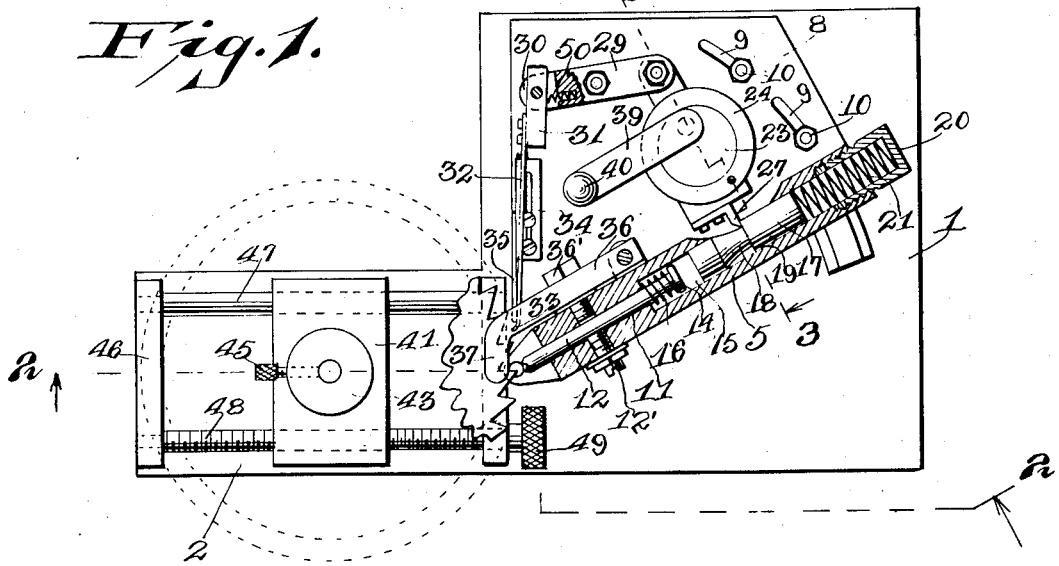
Figure 1 is a plan view of my improved saw swaging device.

Referring more particularly to the drawing, it will be noted that I have provided a substantially rectangular base member 1 having a lateral extension 2 projecting from one side thereof, and extending upwardly from the base at the inner end of the lateral extension is a vertically disposed flange 3 which forms a substantial anvil upon which the saw teeth are adapted to rest.

At one side of the anvil 3, I provide a pivot bolt 4 upon which is mounted a movable arm 5 which carries the hammer.

The arm is provided in its lower face with a groove 6 adapted to receive a tenon 7 carried by the base member 1 which is arcuate in shape as illustrated in Figure 1 for guiding the arm 5 in its adjustment and retaining the same against longitudinal movement. Extending from the arm 5 is a plate 8 provided with slots 9 adapted to receive the adjusting bolts 10 carried by the base, whereby the arm 5 may be readily adjusted to various angles relative to the anvil and retained in such adjusted positions by means of the bolts 10.

Slidably mounted within a central bore 11 in the arm 5 is a plunger 12 having a bifurcated outer end, as shown at 13 for engaging the saw teeth. The head 14 of the plunger 12 operates within a bore 15 and mounted upon the plunger and disposed between the head 14 and one end of the bore 15 is a coil spring 16 normally retaining the plunger in a retracted position.

Slidably mounted within the bore 15 is a movable hammer 17 having an annular reduced portion 18 forming an annular shoulder 19. It will be noted that the bore 15 opens out through one side of the arm 5 and the shoulder 19 is arranged directly opposite this opening. A removable cap 20 closes the outer end of the bore 15 and positioned between the closed end of the cap and the outer end of the hammer 17, is a coil spring 21 adapted to be placed under tension when the hammer 17 is moved outwardly in the bore.

A vertically disposed shaft 22 is carried by the lateral plate 8 at one side of the arm 5 and keyed to this shaft is an eccentric 23 rotatable within a collar 24. The collar 24 is retained against lateral movement relative to the eccentric 23 by means of the set screw 25, the inner end of which travels within an annular groove 26 formed in the face of the eccentric 23. Attached to the collar 24 is a lateral finger member 27 which is adapted to engage the shoulder 19 when the collar 24 is moved through the rotation of the eccentric.

Extending laterally from the collar at one side of the shaft is a lug 28 pivotally connected to a rockable arm 29. The other end of arm 29 is bifurcated to form spaced ears 30 and arranged between these ears is a movable block 31 having an arm 32 adjustably connected to the block 31. It will be apparent from this construction that when the eccentric 23 is rotated, the collar 24 will move to the right in Figure 1, so that the finger 27 engaging the shoulder 19 will impart a sliding movement of the hammer 17 against the tension of the spring 21, whereby as soon as the finger 27 moves out of the path of the shoulder 19 and disengages therefrom, the tension of the spring 21 will throw the hammer 17 against the head 14 of the plunger 12, causing this plunger to be forced outwardly so that the bifurcated end 13 thereof will engage the saw teeth aligned therewith.

Simultaneously, with the above action, the arm 29 will be rocked upon its pivot and impart a reciprocating movement to the arm 32, whereby as soon as the plunger 12 is retracted within its bore, the arm 32 is moved inwardly to engage the next tooth in order for moving the same into the path of the plunger 12.

Attention is directed to the relative position of the arm 32 whereby when the arm 32 is moved inwardly toward the saw teeth, the curved end 33 thereof will readily engage the tooth within its path. However, in swaging different types of saws, the length of the teeth vary considerably and in order to have the curved end 33 adjustable for engaging teeth of different lengths, an adjustable plate 34 is mounted upon the plate 8 and this carries an arm 35 arranged in the path of any lateral movement on the part of the arm 32, whereby adjustment of the arm 35 will permit the curved end 33 of arm 32 to move laterally toward the saw, or to be moved away from the saw, so that it will be properly positioned for engaging the teeth to move the saw a distance equal to the distance between the saw teeth.

In order to retain the saw against incidental movement while the teeth are being swaged, the clamping arm 36 is pivotally connected to one side of arm 5 and the lateral engaging end 37 thereof extends parallel with the upper face of the anvil 3, as shown in Figure 1.

The arm 36 is retained in its operative position above the anvil by means of the screw bolt 38. The arm 36 is pivotally mounted upon the bolt 36' carried by arm 5.

At this time, I wish to call attention to the fact that the outer end of the shaft 22 is provided with a crank arm 39 carrying a handle 40 whereby movement may be readily imparted to the eccentric 23.

As illustrated in the accompanying drawing, circular saws of different diameters may be readily placed in position for swaging the teeth thereof by supporting them upon the transverse member 41 which carries an upright shaft 42 provided at its upper end with a variable cap 43. This cap 43 is formed with a plurality of offset shoulders 44 of different diameters for engaging within the central arbor opening of each saw blade.

Figure 2:
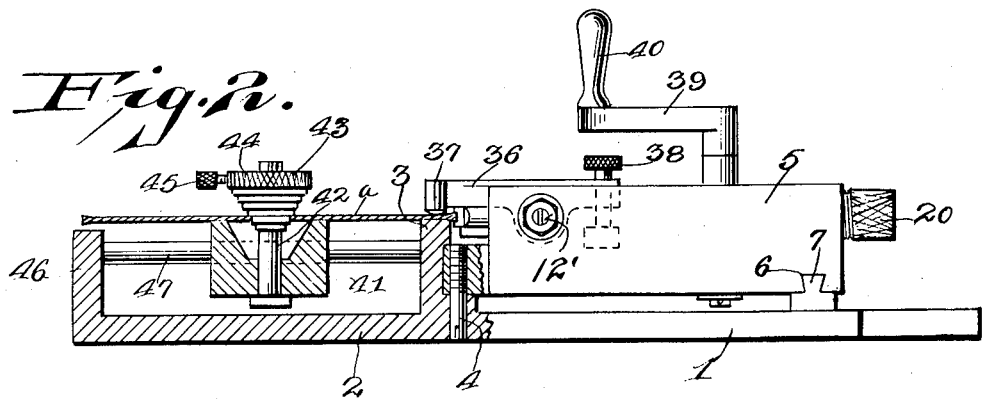
Figure 2 is a sectional view on the line 2—2 of Figure 1.
Figure 3:
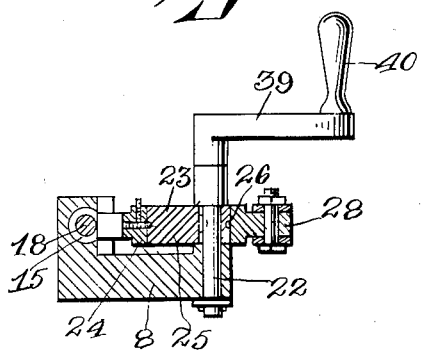
Figure 3 is a detailed section on the line 3—3 of Figure 1.

In Figure 2, it will be noted that the second shoulder on the cap 43 is used for retaining the saw $a$ in position upon the supporting member 41 and the cap 43 is retained against movement on the shaft 42 by means of a set screw 45.

Extending upwardly from the outer end of the lateral member 2 is a flange 46 of substantially the same height as the anvil flange 3 and arranged between the two flanges is a guide rod 47 adapted to be passed through an opening in one end of the supporting member 41.

The other end of the supporting member 41 is provided with a threaded opening to receive the adjusting screw 48 arranged parallel with the guide rod 47 and mounted within the flanges 3 and 46. The outer end of the screw 48 is provided with a knurled thumb piece 49 whereby this screw may be quickly and easily manipulated by hand for adjusting the supporting member 41 on the guide rod 47 according to the diameter of the saw to be mounted thereon.

Where it is desired to mount a cross cut saw, or a similar type of saw other than the circular type, the guide member can be moved in closer to the anvil flange 3 and a slightly different type of clamping mechanism can be used for retaining the saw in position upon the supporting member.

From the foregoing, it will be apparent that in the swaging operation, the finger 27 is actuated through the medium of the eccentric 23 for imparting movement of the hammer 17 against the tension of the coil spring 21, while the tension of the coil spring 21 will urge the hammer into engagement with the head 14 of plunger 12 and immediately following this operation, the arm 32 is urged inwardly for engaging the next saw tooth in order for moving the same into position in front of the plunger 12. It will be noted that arm 32 is normally maintained in contact with the guide arm 35 through the medium of a small coil spring 50 carried by the arm 29 and engaging one side of the block 31.

Attention is also directed to the fact that the plate 8 and the arm 5 may be readily adjusted according to the pitch of the teeth which are to be swaged through the medium of the slots 9 and 10.

The plunger 12 is provided upon one side thereof with a substantially flat face adapted to be engaged with the flat inner end of the set screw 12' to properly retain the bifurcated end 13 in position for engaging the saw teeth and also retain the plunger against rotation, so that when it is forced toward the saw teeth, the bifurcated end will properly engage the teeth.

Another feature to which I wish to call attention is the fact that through adjustment of the screw bolt 38, pressure is applied to the outer end of the clamping arm 36, so as to move the lateral end 37 thereof into engagement with the saw and securely hold the same against movement while being swaged.

It will be apparent from the accompanying drawing, together with the preceding description, that I have provided a very simple and inexpensive manually or power operated saw swaging device which can be easily transported from place to place and can be used for swaging the teeth of saws of various sizes and shapes.

While I have shown and described the preferred embodiment of my invention, it will be apparent from the foregoing that slight changes may be made in the construction when putting the invention into practice without departing from the spirit of the same or the scope of the appended claims.

I claim:

1. A saw swaging device including a base, means for movably clamping a saw thereto, a movable plunger carried by the base for engaging the teeth of a saw, a movable hammer member having an annular shoulder, an eccentrically mounted collar having a lateral projecting finger for engaging said shoulder to impart movement to the hammer in one direction, a coil spring engaged by the hammer when the same is moved in one direction whereby the coil spring is compressed so that the tension of said spring will urge the hammer toward the plunger upon disengagement of the finger from the shoulder, means for manually actuating the collar and means operated in conjunction with the hammer for engaging the saw teeth to advance the saw past the plunger after operation of said plunger.

2. A saw swaging device including a base, means for movably clamping a saw thereto, a pivoted arm adjustably mounted on the base, a plunger carried by the arm for engaging the saw teeth, a manually operated trip controlled hammer member for urging the plunger into engagement with the teeth, means operated in conjunction with the hammer for engaging the saw teeth to move the same past the plunger after actuation thereof, and a clamping member carried by the movable arm and adapted to engage the saw teeth for holding the same stationary during operation of the hammer.

3. A saw swaging device including a base having a lateral extension, a flange extending upwardly at the inner end of the extension to form an anvil, means adjustably mounted upon the extension for clamping a saw in position so that the teeth thereof are movable over the anvil, a pivotally mounted arm adjustable over the base, a plunger carried by the arm for engagement with the saw teeth, means for urging the plunger into engagement with the saw teeth, and means operating in conjunction with the plunger for advancing the teeth in front of the plunger after the actuation of the plunger on the teeth.

4. A saw swaging device comprising a base, a saw support on the base, means rotatably mounting a circular saw on the support, a guide sleeve pivotally connected to the base at one side of the saw support, a swaging plunger slidable in the guide, a light tension spring normally urging the plunger away from the saw, a hammer slidably mounted in the guide, a heavy coil spring normally urging the hammer toward the plunger, means for releasably engaging the plunger to move the same rearward against the tension of the heavy coil spring, said means including a rotatable eccentric and an eccentric collar surrounding the same, and means operated from the eccentric collar for advancing the saw past the plunger after the tripping of the hammer.

WALTER C. TESCH.